Jan. 16, 1951 C. JOHNSON 2,538,622
APPARATUS FOR DETERMINING SURFACE QUALITY
Filed Dec. 8, 1944 2 Sheets-Sheet 1
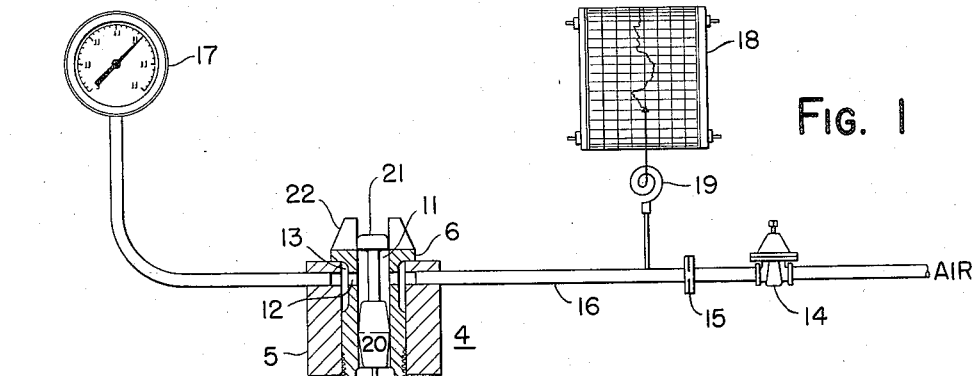
Fig. 1
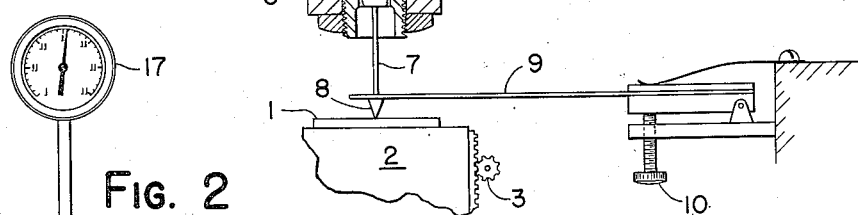
Fig. 2
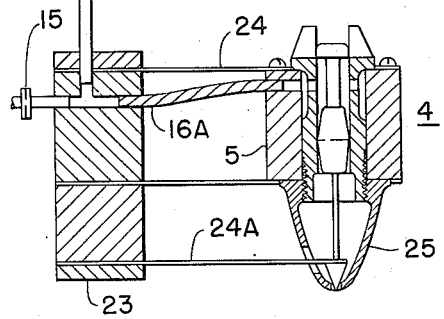
Fig. 3
Fig. 4
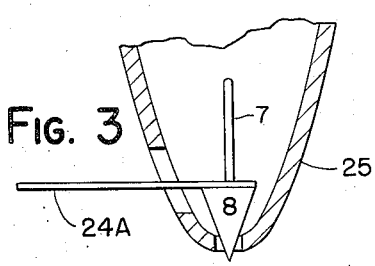
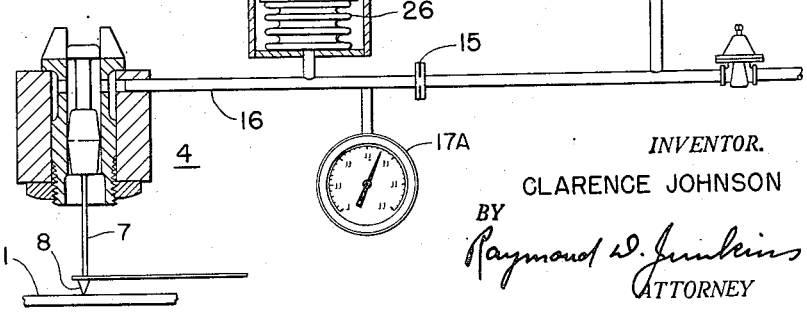
INVENTOR.
CLARENCE JOHNSON
BY Raymond D. Junkins
ATTORNEY Jan. 16, 1951           C. JOHNSON           2,538,622
APPARATUS FOR DETERMINING SURFACE QUALITY
Filed Dec. 8, 1944           2 Sheets-Sheet 2
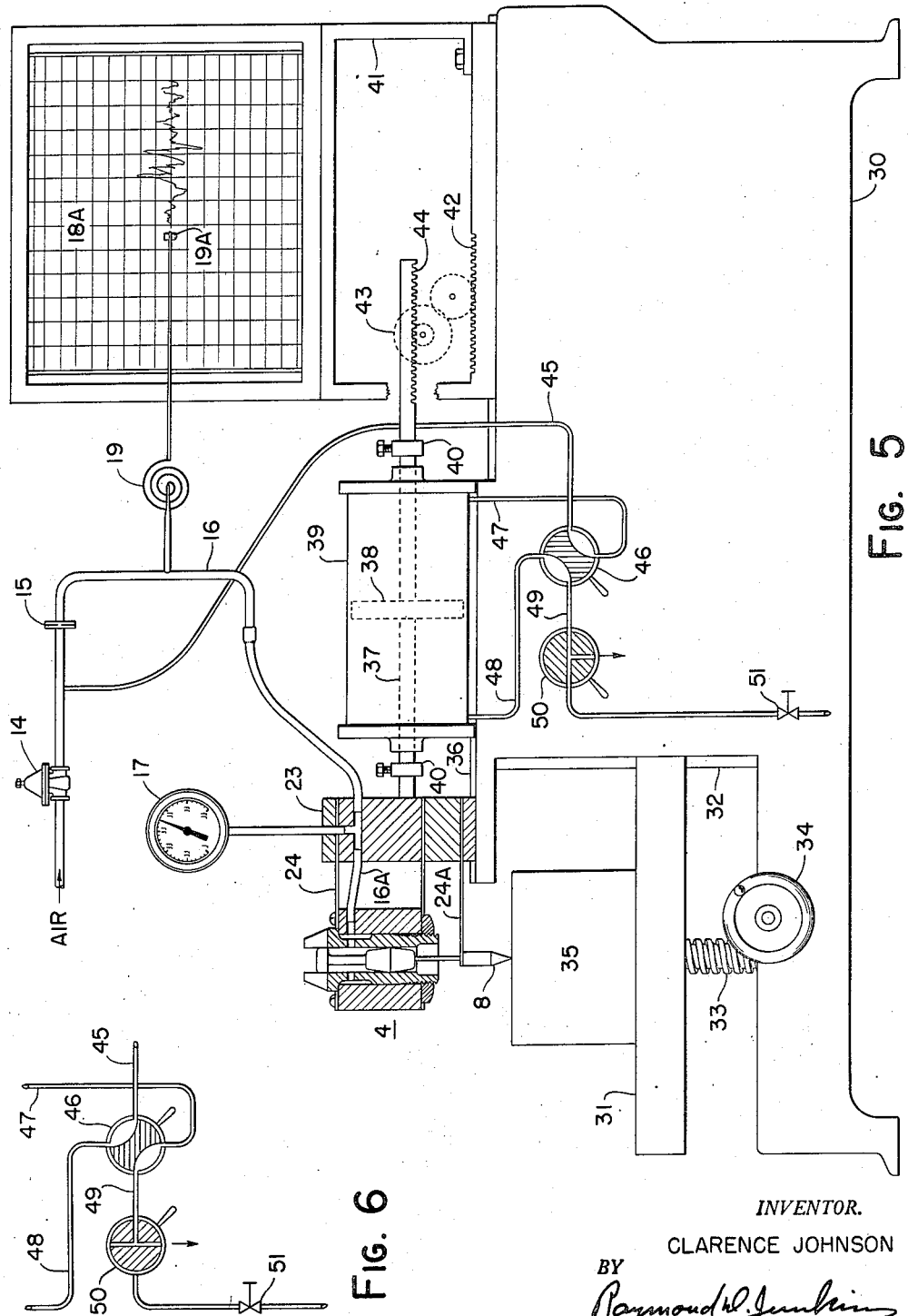
INVENTOR.
CLARENCE JOHNSON
BY
Raymond W. Jenkins
ATTORNEY Patented Jan. 16, 1951

2,538,622

UNITED STATES PATENT OFFICE 2,538,622

APPARATUS FOR DETERMINING SURFACE QUALITY

Clarence Johnson, South Euclid, Ohio, assignor to Bailey Meter Company, a corporation of Delaware Application December 8, 1944, Serial No. 567,280

10 Claims. (Cl. 73—105)

This invention relates to the determination of the quality of a surface, as for example, the measuring and/or indicating of the degree of smoothness or roughness of a machined surface.

A stylus or feeler member, moved over the surface to be analyzed, controls the quantity rate of discharge to the atmosphere of a fluid such as air; the variation in fluid pressure, resulting from a variation in rate of discharge, being a measure of the irregularities of the surface. The measurement may be indicated or recorded in micro-inches, relative values, or the like.

In the drawings:

Figs. 1, 2 and 4 illustrate different embodiments of my invention.

Fig. 3 is an enlarged detail of a portion of Fig. 2.

Fig. 5 illustrates another arrangement of my invention.

Fig. 6 is a transfer valve arrangement for Fig. 5.

Referring now to Fig. 1, I show therein an apparatus adapted to analyze the nature of the surface of a piece of material 1 mounted in any convenient manner on a work holder 2. The holder 2 may be raised or lowered through means 3 to accommodate different types of work pieces 1.

Fixedly mounted above the adjustable work holder 2 is a control couple 4 having a housing 5, a valve sleeve 6 and a valve stem 7. The lowermost end of the valve stem 7 comprises a stylus or feeler 8 shown in the drawing to considerably enlarged scale. Such a feeler is usually a cone diamond, relatively sharp and slender, but not however expected to reach every depression no matter how small, inasmuch as such a point would tend to catch on the irregularities of the surface and either deform or break off. Practical experience has determined the size and shape of the feeler 8 which forms no particular part of the present invention and may, therefore, be considered herein only as of the proper design to sense the hills and valleys of irregularity of the surface 1. In general, the feeler 8 is partially supported by a leaf spring 9 having an adjustment 10 which, along with the adjustment 3, gives an initial position of the feeler 8 relative to the work piece 1.

The valve sleeve 6 has a central passage 11 from which a plurality of ports 12 connect to an annular chamber 13. Air under pressure is supplied to the chamber 13 through a pressure regulator 14, an orifice 15 and a pipe 16. Normally the pressure within the passageway 11 is constant and the same or in uniform proportion to the pressure within the pipe 16. Such pressure is indicated upon an indicating gage 17 and may be recorded upon a time driven chart 18 through the the agency of a Bourdon tube 19.

The valve stem 7 is provided with a land 20 of double slope taper and closely fitting the passageway 11 to provide a minimum of air leakage to the atmosphere. Such leakage forms a film surrounding the land 20 centering the same and provides lubrication for movement of the valve stem 7 axially in the passageway 11. Inasmuch as this bleed is of a uniform rate and minute volume it does not affect the measurement.

The valve stem 7 also includes, beyond the ports 12, a valve member 21 guided between a plurality of fins 22 formed on the valve sleeve 6. When the valve stem 7 is moved (upwardly in the drawing) from the position shown in Fig. 1 the lower face of the valve member 21 is moved out of alignment with the root circle of the fins 22, thus allowing a bleed of air from the passageway 11 to the atmosphere between the fins 22. The greater the upward movement of the valve stem 7 the greater the rate of air bleed to the atmosphere from the passageway 11.

As the discharge to the atmosphere from the passage 11 varies, the back pressure in the pipe 16 will vary and such variation becomes a measure of the axial movement of the valve stem 7, and thereby of movement of the feeler 8. Such variations in back pressure may be indicated on the gage 17 or recorded upon the time driven chart 18 in terms of air pressure, micro-inch movements of the feeler 8, relative movements, or the like.

In order that the feeler 8 may be sensitive to both peaks and valleys in the surface 1, it is essential that it be allowed to move both upwardly and downwardly (Fig. 1) and thus both increase and decrease the pressure of air within the pipe 16. To accomplish this, an initial adjustment, through the agency of means 3 and 10, is made so that a normal or initial slight bleed occurs past the valve member 21 (between the fins 22) and the pressure within the chamber 11 under such conditions is really the datum line on the gage 17 or chart 18. Thereafter, downward movement of the feeler 8 will decrease the rate of air bleed, and thereby increase the pressure within the pipe 16. Upward movement of the feeler 8 will increase the rate of air bleed to the atmosphere and thereby decrease the back pressure in the pipe 16. Thus the gage 17 and chart 18 will show movements both above and below the datum line, or a graphic representation of the hills and valleys of the surface 1. It will be appreciated that usual arrangements may be provided for uniformly traversing the feeler 8 over the work surface 1 in any desired direction for analyzing the quality of as much of the surface 1 as may be contacted by the feeler 8.

In Fig. 2 I show an arrangement wherein both portions of the control couple 4 may contact the surface to be analyzed and the differential action, or position, between the two portions determines the bleed to atmosphere of air from the pipe 16A. In this arrangement the indication is more of an average of the peaks and valleys of the surface rather than an exact reproduction of each, as was the case in the arrangement of Fig. 1.

The block 23 may be positioned relative to the surface to be analyzed, or may be moved so that the feeler arm traverses such surface. The housing 5 of the control couple 4 is supported from the block 23 by leaf springs 24. Communication between the orifice 15, gage 17, and chamber 11 is had by a flexible tubing 16A. One or more leaf springs 24A connect the block 23 with the valve stem 7 adjacent the feeler 8 so that the control couple 4 is supported as a whole from the block 23 and with the possibility of relative movement between the pilot stem 7 and the valve sleeve 6 in its housing 5. The latter comprises a nose extension 25 having a rounded lowermost extremity through which the point of the feeler 8 extends. The nose section 25 normally rides over the surface, contacting some of the high points, while the feeler point 8 engages some or all of the irregularities. The relative position of the portions of the couple determine the rate of bleed of air to the atmosphere, and thereby the value of air pressure within the pipe 16A effective upon the indicator 17. I illustrate in Fig. 3 the portions 8 and 25 to amplified scale.

In Fig. 4 I illustrate an embodiment including a control couple 4A in series with the control couple 4 providing greater amplification in the determination of irregularities in the surface 1. Air pressure in the pipe 16 is effective within a bellows 26, spring opposed by a spring 27, and effective in positioning the valve stem 28 of a control couple 4A. Variations in pressure within the pipe 16 are effective in positioning the valve stem 28 and producing variations in pressure within a pipe 29 to which the pressure gage 17 is connected. The arrangement provides an amplification in pressure variations many fold over that shown in the previous embodiments.

I show at 17A a pressure indicator sensitive to the pressure within the pipe 16. This indicator I consider as a "coarse" indicator having an operating range of, for example, 10–40 p. s. i. for a vertical movement of the pilot stem 7 of, for example, .005".

At 17 the indicator is considered as a "fine" indicator having a range of, for example, 10–40 p. s. i. for a movement of the valve stem 28 amounting to, for example, .00005". In other words, the amplification due to the control couple 4A is 100–1.

It is quite possible that further cascading of control couples may be had if the need is indicated. I feel, however, that an amplification of 100–1, as illustrated in Fig. 4, will usually satisfy the demand for surface analyzing. With the arrangement of Fig. 4 the "fine" indicator 17 will be observed when the stylus 8 is used to analyze a surface of extreme smoothness, for as previously mentioned the full range of the indicator 17 is accomplished for a vertical movement of the stylus 8 of one-half of a ten-thousandth, or .00005".

In normal usage either the gage 17A or the gage 17, or both, may be observed and with proper indications and calibrations of the dial markings then relatively coarse peaks and valleys of the surface 1 are indicated on the gage 17A while the more minute irregularities are indicated on the gage 17. During the time that the gage 17A is sensitive to major irregularities the pointer of the gage 17 may be at its maximum limit of travel without harm.

It will be appreciated in the arrangement of Fig. 4 that an operation of the control couple 4 to produce an increase in the pressure in pipe 16 results in an operation of the control couple 4A to produce a decrease in pressure in the pipe 29. The change in pressure in pipe 29 is much greater than the pressure change in pipe 16, and the indicator 17 moves through its full range while the indicator 17A moves through only a small portion of its range. The indicator 17 may be calibrated, however, so that its movement on decreasing pressure indicates changes in surface conditions the same as the indications provided by the indicator 17A on increasing pressure. If desired, the control couple 4A may be inverted and have the valve stem 28 extend from the other end of the valve element to the bellows so that the valve element will move to increase the pressure in pipe 29 while the pressure increases in pipe 16. The same result could be obtained with the couple 4A in the position shown, but with the pipe 16 connected in communication with the exterior of the bellows 26, and the spring 27 arranged to expand the bellows.

In Fig. 5 I indicate a further arrangement of my invention in a complete surface analyzing machine. For the sake of ready understanding the parts of Fig. 5 are shown more or less diagrammatically and not to uniform scale. For example, the supporting assembly 23, and the piston-cylinder assembly for positioning the same, are shown at approximately full scale. However, the recording chart, work table and general supporting base are shown at greatly reduced scale. Inasmuch as my invention does not pertain to or depend upon the actual dimensions of these various parts, it will be apparent that a more ready understanding is obtainable by showing the parts out of true scale and more or less diagrammatically in arrangement and assembly.

I indicate at 30 a machine base having a work holding table 31 vertically positionable along guiding ways 32 through the agency of a screw 33 and micrometer adjusting wheel 34. A work piece 35 may be held on the work table 31 by clamps, magnetic or other means. Preferably the work table 31 is first lowered sufficiently to place the work 35 in position beneath the stylus 8. The work is then raised until it encounters the stylus 8, lifting the same sufficiently to cause a pressure indication on the gage 17 to be used as a datum line. Thereafter transverse positioning of the stylus 8 across the surface to be analyzed will reproduce in the gage 17 pressure variations indicative of irregularities in said surface.

The control couple 4 and its supporting member 23 are similar to that indicated in Fig. 2. The supporting block 23 has a finished lower surface slideable along the top machined surface 36 of the supporting stand 30. Preferably the stand 30 has provision for manually leveling the surface 36 so that a transverse movement of the assembly 4, 23 along the surface 36 will traverse the stylus 8 across the work 35.

Fastened to the block 23, for the purpose of transversely moving it, is a piston rod 37 positionable by a piston 38 acting in a cylinder 39. The cylinder 39 is fixedly located on the surface 36. The piston rod 37 is provided with adjustable stops 40 limiting the travel of the piston 38, and thereby the assembly 4, 23 in either direction.

Connected to the pressure pipe 16 is a Bourdon tube 19 adapted to make a record on a movable flat sheet chart 18A. The chart 18A may comprise an ordinary sheet of graph paper held in a framework 41 and positioned along the surface 36 through the agency of a rack 42, gearing 43, and a rack 44 provided on an extension of the piston rod 37. Preferably the gear reduction 43 is about 100–1 so that a movement of the feeler 8 a distance of one-tenth of an inch across the work surface 35 results in a positioning of the graph 18A a distance of ten inches under the recording stylus 19A. The remaining coordinate of the graph 18A may be graduated in micro-inches or other units of magnitude to show graphically the irregularities of the surface being analyzed.

By the arrangement described the movement of the chart or graph 18A under the stylus 19A is unchangeably correlated with movement of the feeler 8 and amplified to any desired extent. The resulting graph produced on the chart 18A "spreads out" the .10" of surface 35 analyzed to a ratio of approximately 100–1 for more ready study and analysis.

It is to be appreciated that the chart analyses at various portions of the surface of the work piece may be taken at will. Furthermore that the arrangement of Fig. 4 may be incorporated in the assembly of Fig. 5 so that a plurality of markers may simultaneously record on the graph 18A. One marker may be a "coarse" indication, while the other marker may be a "fine" indication.

For uniformly moving the piston 38 (illustrated as moving the feeler 8 from right to left) I provide a source of uniform pressure air through the pipe 45 to the valve 46 and pipe 47 leading to the right hand end of the cylinder 39. From the left-hand end of the cylinder 39 air bleeds through a pipe 48, the valve 46, pipe 49, valve 50, and hand positioned throttling valve 51. Variation in restriction of the drain valve 51 regulates the speed of movement of the piston 38 toward the left.

When the complete graph 18A has been completed and it is desired to return the piston 38 to its starting point at the right, then valves 46, 50 are manually turned to the position shown in Fig. 6 wherein the right-hand end of the cylinder 39 is connected through the pipe 47, valve 46, pipe 49, and valve 50 to the atmosphere without going through the throttling valve 51. At the same time air available through the pipe 45 passes through the valve 46 and pipe 48 to the left-hand end of the cylinder 39 to return the piston 38 to its limit of travel toward the right.

It will be understood that while I have described a preferred embodiment utilizing the bleed of air to the atmosphere, I use air only as representative of any suitable fluid which may be bled to the atmosphere to provide a fluid pressure representative of a measurement.

What I claim as new, and desire to secure by Letters Patent of the United States, is:

1. Apparatus for determining the irregularities of a surface including, in combination, a control couple having relatively movable parts, one of the parts comprising a valve housing, the other of the parts comprising a valve member positionable in the housing, said valve member having an extension forming a feeler for engaging the surface, resilient means supporting said valve member for movement relative to said valve housing, means for supplying pressure fluid from a constant pressure source to said control couple, said couple forming a fluid bleed valve arranged to discharge fluid to the atmosphere at a rate dependent upon the relative positions of said parts and so constructed and arranged that the pressure of the fluid behind the valve varies with the rate of such discharge, means including a relay sensitive to said fluid pressure for establishing a second fluid pressure, said last mentioned means operating on changes in the pressure behind said valve to produce amplified changes in said second fluid pressure directly proportional to the changes in the first fluid pressure, and indicating means sensitive to said second fluid pressure.

2. Apparatus for determining the irregularities of a surface comprising, in combination, control couples, each having relatively movable parts, one of said parts comprising a valve housing and the other comprising a valve member positionable in said housing, an extension on one of said valve members forming a feeler for engaging said surface, a constant pressure source of fluid for said control couples, said couples forming fluid bleed valves arranged to discharge fluid to the atmosphere at a rate dependent upon the relative positions of said parts, and so constructed and arranged that the pressure of the fluid behind said valves varies with the rate of such discharge, means responsive to the pressure behind one of said valves for positioning one of the parts of the other of said valves, and indicating means sensitive to the pressures behind said valves.

3. Apparatus for determining the irregularities of a surface comprising, in combination, control couples, each having relatively movable parts, one of said parts comprising a valve housing and the other comprising a valve member positionable in said housing, means for supplying pressure fluid from a constant pressure source to said control couples, said couples forming fluid bleed valves arranged to discharge fluid to the atmosphere at a rate dependent upon the relative positions of said parts and so constructed and arranged that the pressure of the fluid behind said valves varies with the rate of such discharge, an extension on one of said valve members forming a feeler for engaging said surface, means responsive to the pressure behind the one of said valves whose valve member engages said surface for positioning the valve member of the other of said valves to produce a pressure varying with the first pressure but at an increased rate, and indicating means sensitive to the pressures behind said valves.

4. Apparatus for determining the irregularities of a surface comprising, in combination, a control couple having relatively movable parts, one of the parts comprising a valve housing, the other of the parts comprising a valve member positionable in said housing, means resiliently supporting said valve housing in engagement with said surface, an extension on said valve member forming a feeler for engaging said surface, resilient means for supporting said valve member on said surface, a constant pressure source of fluid for the control couple, said couple forming a fluid bleed valve arranged to discharge fluid to the atmosphere at a rate dependent upon the relative positions of said parts and so constructed and arranged that the pressure of the fluid behind the valve varies with the rate of discharge, means including a second control couple having relatively movable parts for establishing a second fluid pressure, a fluid motor sensitive to the fluid pressure behind said first control couple for moving one of the parts of said second control couple relative to the other, and means positioned by said second fluid pressure indicating movement of said feeler.

5. The combination of claim 4 including indicating means responsive to the first established fluid pressure, and separate indicating means responsive to the second established fluid pressure.

6. Apparatus for determining the irregularities of a surface comprising, in combination, a work table and a work piece thereon having a surface whose irregularities are to be determined, means for vertically adjusting said table, a control couple having relatively movable parts, one of the parts comprising a valve housing and the other comprising a valve member, means for supplying fluid from a constant pressure source to said control couple, said control couple forming a bleed valve arranged to discharge fluid to the atmosphere at a rate dependent upon the relative positions of said parts and thereby produce a pressure representative of said relative positions, an extension on one part of said control couple forming a feeler for engagement with said surface, power actuated means connected to the other part of said control couple and operative to move the latter over said surface, a plotting paper connected for movement by said power actuated means, such movement representative of one plotting ordinate of a graph, a pressure sensitive means responsive to the pressure behind said control couple, and a marker positioned by said sensitive means relative to said plotting paper representative of the other ordinate of the graph.

7. The combination of claim 6 including motion multiplying means between the power means and the plotting paper.

8. Apparatus for determining the irregularities of a surface comprising, in combination, a valve housing having a portion engageable with the surface, means for yieldingly supporting said housing in engagement with said surface, a valve member positionable within said housing, said valve member having an extension forming a feeler extendible beyond said housing into engagement with said surface for positioning said valve member with respect to said housing, the area of engagement of said feeler with said surface being smaller than the area of engagement of said housing with said surface, and means for yieldingly supporting said valve member with its feeler portion engaging said surface, means for supplying pressure fluid from a constant pressure source to said valve housing, said valve member arranged to discharge fluid to the atmosphere at a rate dependent upon the relative positions of said housing and said valve member and so constructed and arranged that the pressure of the fluid behind the valve varies with the rate of such discharge, and indicating means sensitive to said fluid pressure behind said valve.

9. Apparatus for determining the irregularities of a surface comprising, in combination, a valve housing having a portion engageable with the surface, a valve member positionable within said housing, said valve member having an extension forming a feeler extendible beyond said housing into engagement with said surface for positioning said valve member with respect to said housing, the area of engagement of said feeler with said surface being smaller than the area of engagement of said housing with said surface, a block having a surface perpendicular to the axis of movement of said valve member, a leaf spring extending normal to said last mentioned surface for connecting said valve housing to said block, and another leaf spring extending normal to said last mentioned surface for connecting said valve member to said block, means for supplying pressure fluid from a constant pressure source to said valve housing, a fluid bleed valve coextensive with said valve member positionable within said housing and arranged to discharge fluid to the atmosphere at a rate dependent upon the relative positions of said housing and said valve member and so constructed and arranged that the pressure of the fluid behind the valve varies with the rate of such discharge, and indicating means sensitive to said second fluid pressure.

10. Apparatus for measuring variations in a surface condition comprising, in combination, means including control elements movable relative to each other, means for supplying fluid from a constant pressure source to said control elements, said control elements forming a bleed valve arranged to discharge fluid to the atmosphere at a rate dependent upon the relative positions of said elements and thereby produce a pressure representative of said relative positions, an extension on one element for scanning said surface, power actuated means connected to the other element and operative to move them both over said surface, means for moving a chart along a straight line in a given plane, a marking pen, and means responsive to said control pressure for moving said marking pen across said chart in a direction substantially normal to its direction of movement.

CLARENCE JOHNSON.

REFERENCES CITED

The following references are of record in the file of this patent:

UNITED STATES PATENTS

| Number | Name | Date |
|---|---|---|
| 1,931,925 | Hopkins | Oct. 24, 1933 |
| 1,938,492 | Moller | Dec. 4, 1933 |
| 1,985,576 | Mennesson | Dec. 25, 1934 |
| 2,171,433 | Powers | Aug. 29, 1939 |
| 2,240,278 | Abbott | Apr. 29, 1941 |
| 2,244,864 | Witham, Jr. | June 10, 1941 |
| 2,305,264 | Leonard | Dec. 15, 1942 |
| 2,330,801 | Abbott | Oct. 5, 1943 |
| 2,354,423 | Rosenberger | July 25, 1944 |
| 2,369,319 | Smith | Feb. 13, 1945 |
| 2,374,154 | Moore | Apr. 17, 1945 |
| 2,375,600 | Wattebot | May 8, 1945 |